United States Patent Office 3,552,872
Patented Jan. 5, 1971

3,552,872
COMPUTER POSITIONING CONTROL SYSTEM WITH MANUAL BACKUP CONTROL ESPECIALLY ADAPTED FOR OPERATING STEAM TURBINE VALVES
Theodore C. Giras and William W. Barns, Jr., Pittsburgh, Pa., assignors to Westinghouse Electric Corporation, Pittsburgh, Pa., a corporation of Pennsylvania
Filed Apr. 14, 1969, Ser. No. 815,882
Int. Cl. F01b 25/00
U.S. Cl. 415—17
17 Claims

ABSTRACT OF THE DISCLOSURE

A digital computer system generates time series turbine valve position setpoint control words which are converted to analog values and multiplexed for application to track and hold circuits associated with respective electrohydraulic turbine valve position control loops. During manual operation, a manual control applies a setpoint control signal to all of the track and hold circuits in parallel. A read multiplexer keeps the computer updated on valve positions during manual control.

CROSS REFERENCE TO RELATED APPLICATIONS

Ser. No. 722,779, filed Apr. 19, 1968, entitled Improved System and Method for Operating a Steam Turbine and an Electric Power Generating Plant, filed by M. Birnbaum and T. Giras and assigned to the present assignee.

BACKGROUND OF THE INVENTION

The present invention relates to computer process control systems and more particularly to electric power plant steam turbines and digital computer control systems arranged to operate such turbines.

The flow of steam through a steam turbine is determined by positioning the turbine admission valves in order to control the turbine speed and/or load. Turbine valve positioning may additionally be directed to throttle pressure control where such control is required for the steam generating system.

In the aforementioned Birnbaum and Giras copending patent application, there is presented a survey of the prior steam turbine control art. Generally, automatic steam turbine valve control has developed from essentially mechanical and mechanical-hydraulic type control systems to essentially electrohydraulic type control systems. The Birnbaum and Giras application discloses a further advanced automatic digital electrohydraulic turbine control system which employs a programmed digital computer in its preferred form. A paper entitled Digital Control for Large Steam Turbine-Generators presented to the American Power Conference during Apr. 23–25, 1968 by M. Birnbaum and T. Giras describes a similar computer type turbine control system.

In addition to automatic control, safety and reliability in steam turbine operation usually makes it desirable to employ manual backup control. To interface the manual control with the automatic control and the steam turbine, it is necessary to provide suitable conditions for bumpless or other appropriate transfer from automatic to manual control and from manual to automatic control. In turn, the character of the automatic valve positioning control as well as the character of the interfacing arrangement itself enter into determining the efficiency and economy with which automatic/manual steam turbine control is provided. This is particularly so in relation to large steam and other turbine control systems which involve positioning control over a plurality of steam turbine admission valves.

Prior art electrohydraulic control systems typically might provide for manual backup control but such schemes are limited to analog type systems. The present invention is directed to a positioning control system and particularly a steam turbine valve positioning control system in which a digital computer provides fast and accurate positioning operation and with which a manual backup positioning control is efficiently, economically, reliably and safely interfaced.

SUMMARY OF THE INVENTION

In accordance with the broad principles of the present invention, a digital computer positioning control system includes a digital/analog converter which is coupled between the computer and a multiplexer to supply analog position setpoints corresponding to digital position setpoints computed by the computer. In the preferred embodiment, each of a plurality of position actuators or drives associated with respective steam turbine valves or the like is provided with a setpoint analog signal from a track and hold integrator. The respective integrators are in turn sequentially updated from the converter through the multiplexer during automatic position control operation. A manual backup control is also coupled to the inputs of the integrators and a read multiplexer system detects the integrator outputs during manual backup operation to provide updating position data for the computer and thereby enable control mode transfer to be made bumplessly from manual to automatic.

It is therefore an object of the invention to provide a novel digital computer control system which is especially useful for steam turbine valve position control and which is interfaced with a manual backup positioning control for efficient and economic operation.

It is another object of the invention to provide a novel digital computer control system which is especially useful for steam turbine valve position control and which provides manual backup positioning control with safety and reliability.

A further object of the invention is to provide a novel digital computer control system which is especially useful for steam turbine valve position control and which provides manual backup positioning control with reduced hardware investment.

An additional object of the invention is to provide a novel digital computer control system which is especially useful for steam turbine valve position control and which provides manual backup positioning control with highly limited valve positioning error in the event of computer or other malfunction.

It is a further object of the invention to provide a novel digital computer control system which is especially useful for steam turbine valve position control and which provides manual backup positioning control with provisions for efficiently updating the computer regarding manual position control actions.

Another object of the invention is to provide a novel digital computer control system which is especially useful for steam turbine valve position control and which provides manual backup positioning control with provision for thermally safe turbine operation during contingency situations through the use of manual parallel governor valve positioning in place of the automatic sequential governor valve positioning when a transfer is made from automatic to manual operation.

These and other objects of the invention will become more apparent upon consideration of the following detailed description along with the attached drawings.

DESCRIPTION OF THE PREFERRED EMBODIMENT

Figure 1:
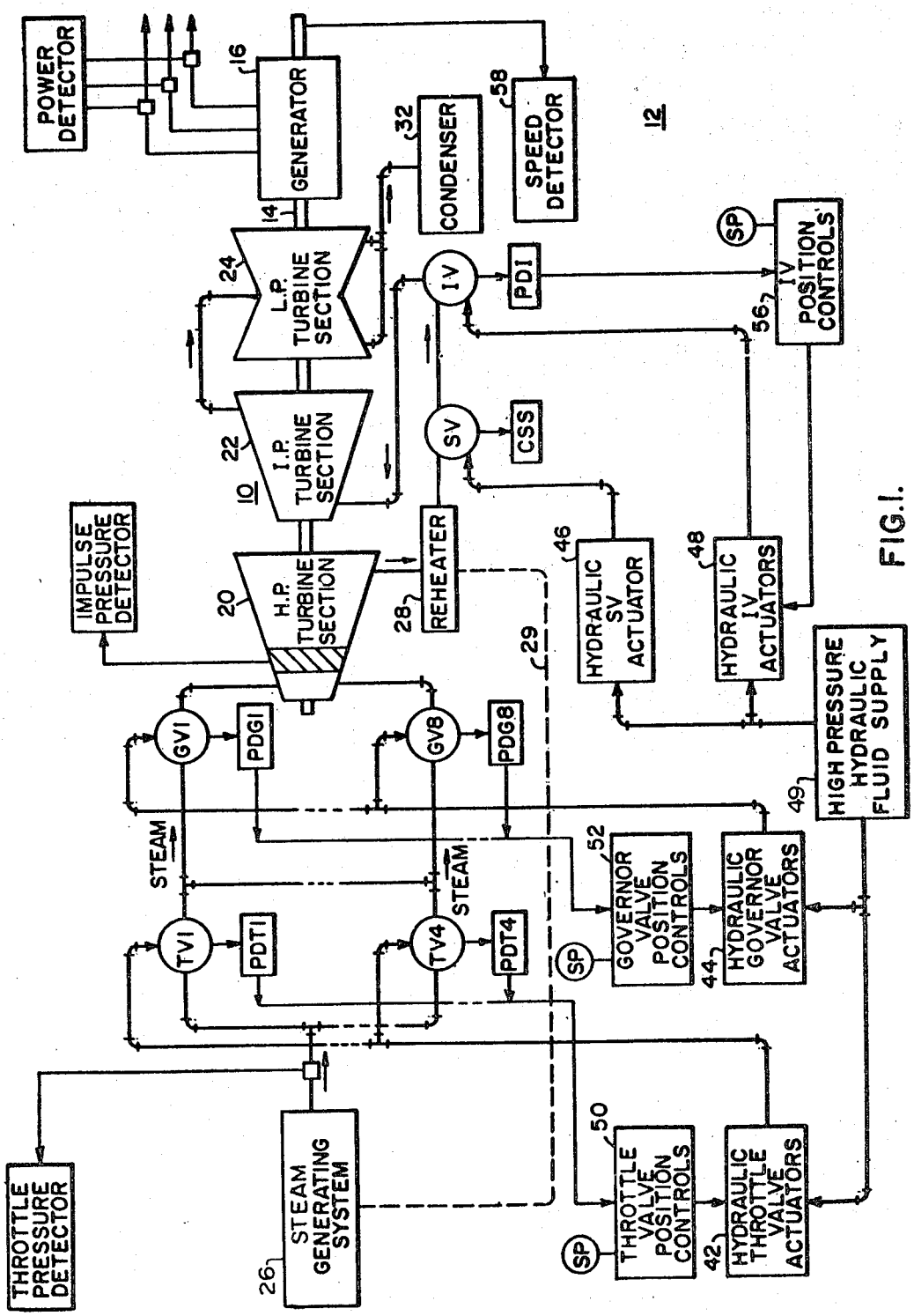
FIG. 1 shows a schematic diagram of a large steam turbine which is operated in accordance with the principles of the invention.
Figure 2:
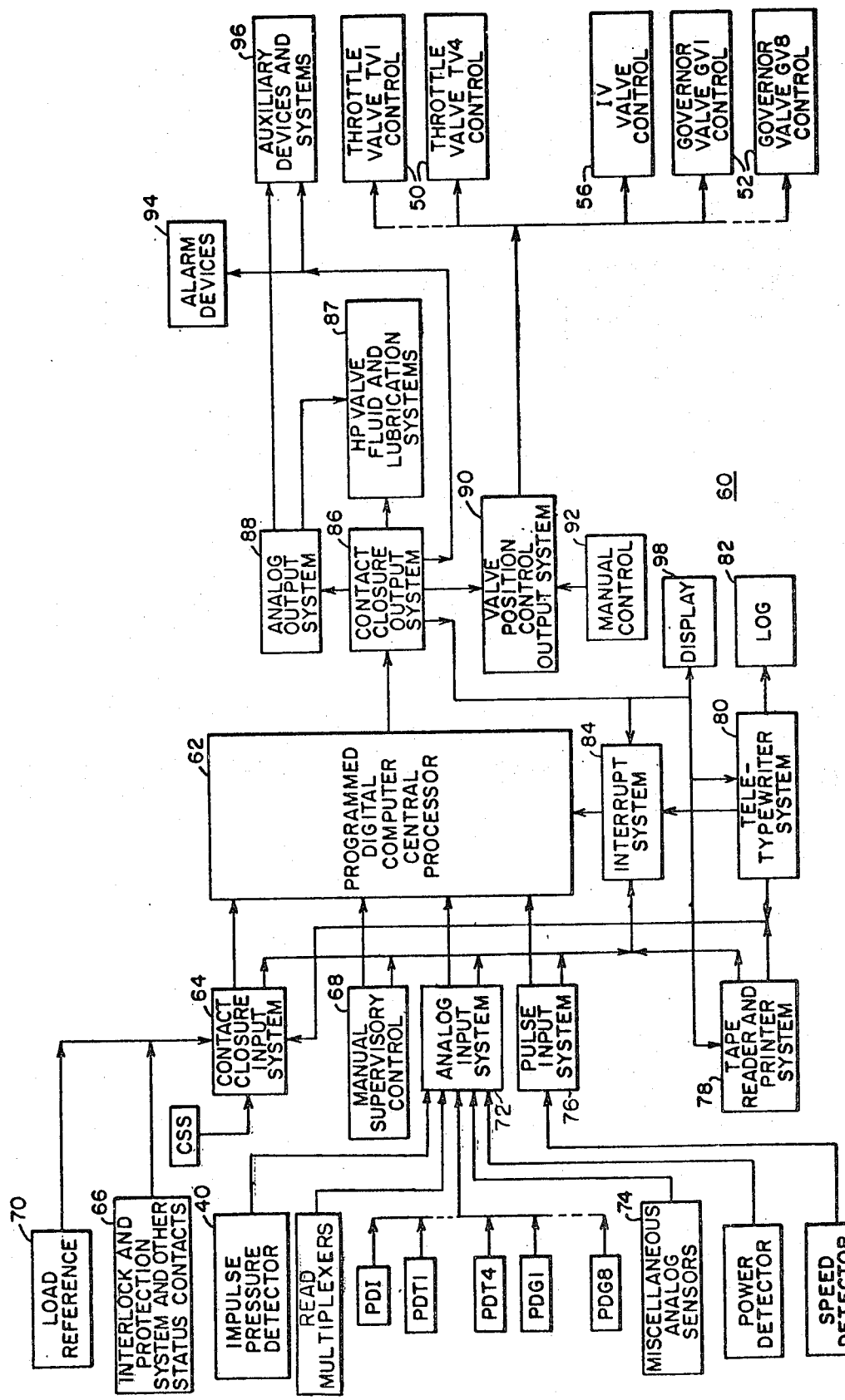
FIG. 2 shows a schematic diagram of a programmed digital computer control system operable with the steam turbine and its associated devices shown in FIG. 1 in accordance with the principles of the invention.

More specifically, there is shown in FIG. 1 a large single reheat steam turbine 10 constructed in a well known manner and operated and controlled by a programmed digital computer control system 60 (FIG. 2). Preferably, the programmed computer control system 60 functions in a manner like that described in the aforementioned Birnbaum and Giras patent application. The steam turbine 10 and the preferred control system 60 are described herein as an apparatus environment within which the invention is especially useful. However, the invention does have application in other digital process control computer applications and with other types of steam turbines.

The steam turbine 10 is provided with a single output shaft 14 which drives a conventional large alternating current generator 16 to produce three phase electric power (or other phase electric power) as measured by a conventional power detector. Typically, the generator 16 is connected (not shown) through one or more breakers (not shown) per phase to a large electric power network and when so connected causes the turbogenerator arrangement to operate at synchronous speed under steady state conditions. Under transient electric load change conditions, system frequency may be affected and conforming turbogenerator speed changes would result. At synchronism, power contribution of the generator 16 to the network is normally determined by the turbine steam flow which is supplied to the turbine 10 from a suitable steam generating system 26.

In this case, the turbine 10 is of the multi-stage axial flow type and includes a high pressure section 20, an intermediate pressure section 22 and a low pressure section 24. Each of these turbine sections may include a plurality of expansion stages provided by stationary vanes and an interacting bladed rotor connected to the shaft 14. In other applications, turbines operated in accordance with the present invention can have other forms with more or fewer sections tandemly connected to one shaft or compoundly coupled to more than one shaft.

It is further noted that the turbine 10 is of the plural inlet front end type, and steam flow is accordingly directed to the turbine steam chest (not specifically indicated) through four throttle inlet valves TV1–TV4. Generally, the plural inlet type and other front end turbine types such as the single ended type or the end bar lift type may involve different numbers and/or arrangements of throttle valving.

Steam is directed from the admission steam chest to the first high pressure section expansion stage through eight governor inlet valves GV1–GV8 which supply steam to inlets arcuately spaced about the turbine high pressure casing thereby forming a somewhat typical governor valving arrangement for large fossil fuel turbines. Nuclear turbines might on the other hand typically utilize only four governor valves.

During stratup, the governor valves GV1–GV8 are typically all fully open and steam flow control is provided by full arc throttling valve operation. At some point in the startup process, transfer is made from full arc or throttle valve control to partial arc or governor valve control because of throttling energy losses and/or throttling control capability. Upon transfer, the throttle valves TV1–TV4 are full open, and the governor valves GV1–GV8 are individually operated in a predetermined sequence usually directed to achieving thermal balance on the rotor and reduced rotor blade stressing while producing the desired turbine speed and/or load operating level.

In a typical governor valve control mode, governor valves GV5–8 may be initially closed as the governor valves GV1 through GV4 are jointly operated from time time to defined positions producing the desired corresponding total steam flows. After the governor valves GV1–GV4 have reached the end of their control range, i.e. upon being fully opened or at some overlap point prior to reaching their full open position, the remaining gvernor valves GV5–GV8 are sequentially placed in operation in numerical order to produce continued steam flow control at higher steam flow levels. This governor valve sequence of operation is based on the assumption that the governor valve controlled inlets are arcuately spaced about the 360° periphery of the turbine high pressure casing and that they are numbered consecutively about the periphery so that the inlets corresponding to the governor valves GV1 and GV8 are arcuately adjacent to each other.

The preferred turbine startup method is to (1) raise the turbine speed from the turning gear speed of about 2 r.p.m. to about 80% of the synchronous speed under throttle valve control and then (2) transfer to governor valve control and raise the turbine speed to the synchronous value, close the power system breaker(s) at synchronism and meet the load demand. On shutdown, similar but reverse practices can be employed or the conventional coastdown procedure can be used.

After the steam has coursed past the first stage impulse blading to the last stage reaction blading of the high pressure section, it is directed to a reheater system 28 which is associated with the steam generating system 26. In practice, the reheater system 28 might typically include a pair of parallel connected reheaters associated with opposite sides of the turbine casing and coupled to the steam generating system 26 in heat transfer relation as indicated by the reference character 29.

With a raised enthalpy level, the reheated steam flows from the reheater system 28 through the intermediate pressure turbine section 22 and the low pressure turbine section 24. From the latter, the vitiated steam is exhausted to a condenser 32 from which water flow is directed (not indicated) back to the steam generating system 26.

To control the flow of reheat steam, stop valving SV including one or more check valves is normally open and is closed only to prevent steam backflow or to protect against turbine overspeed. Intercept valving IV including a plurality of valves (only one indicated) is also provided in the reheat steam flow path, and in this instance it is normally open and it operates over a range of positioning control to provide reheat steam flow cutback modulation under turbine overspeed conditions.

In general, the steady state power or load developed by a steam turbine supplied with substantially constant throttle temperature steam is determined as follows:

$$\text{Power or load} = K_P \frac{P_i}{P_0} = K_F S_F$$

where:

$P_i$=first stage impulse pressure
$P_0$=throttle pressure
$K_p$=constant of proportionality
$S_F$=steam flow
$K_F$=constant of proportionality.

If the throttle pressure is held substantially constant by external control, the turbine load is proportional to the first stage impulse pressure $P_i$ and the pressure $P_i$ can thus be used for load control purposes. If throttle pressure $P_0$ undergoes some variation as in once through boiler plants, the ratio of $P_i/P_0$ may be used for load control purposes. Further information on turbine control philosophy can be obtained in the aforementioned Birnbaum and Giras patent application.

Respective hydraulically operated throttle valve actuators indicated by the reference character 42 are provided for the four throttle valves TV1–TV4. Similarly, respective hydraulically operated governor valve actuators indicated by the reference character 44 are provided for the eight governor valves GV1–GV8. Hydraulically operated actuators indicated by the reference characters 46 and 48 are also provided for the reheat stop and interact valving SV and IV. A computer sequenced and monitored high pressure fluid supply 49 provides the controlling fluid for actuator operation of the valves TV1–TV4, GV1–GV8, SV and IV. A computer supervised lubricating oil system (not shown) is separately provided for turbine plant lubricating requirements.

The respective actuators 42, 44, 46 and 48 are of conventional construction, and the inlet valve actuators 42 and 44 and in this instance the intercept valve actuators 48 are operated by respective computer operated position controls indicated by the reference characters 50, 52 and 56. Each of the position controls includes electronic circuitry with a conventional analog controller which drives a suitable known actuator servo valve. Further detail on the position control electronic circuitry will be presented subsequently herein. The reheat stop valve actuators 46 are manually or computer controlled to be fully open unless conventional trip system operation or other operating means causes them to close and stop the reheat steam flow.

Steam valve positioning is used in this instance to produce control over steam flow as an intermediate variable and over turbine speed and/or load as an end controlled variable(s). Actuator operation provides the steam valve positioning, and respective valve position detectors PDT1–PDT4, PDG1–PDG8, and PDI are provided to generate respective valve position feedback signals for developing position error signals to be applied in respective local analog control loops to the respective position controls 50, 52 and 56. One or more contact sensors CSS provide status data for the stop valving SV. The position detectors are provided in suitable conventional form, for example they can make conventional use of linear variable differential transformer operation in generating negative position feedback signals for algebraic summing with respective position setpoint signals SP in developing the respective input position error signals. Position control operation of the intercept valving IV would typically be provided only under reheat steam flow cutback requirements.

The combined position control, hydraulic actuator, valve position detector element and other miscellaneous devices (not shown) form a fast local electrohydraulic analog valve position control loop for each throttle or governor inlet steam valve. As subsequently described more fully herein, the position setpoints SP are computer determined and supplied to the respective local loops and updated on a periodic basis. Setpoints SP are also computed for the intercept valve controls. A more complete general background description of analog electrohydraulic steam valve positioning and hydraulic fluid supply systems for valve actuation is presented in a paper entitled "Electrohydraulic Control for Improved Availability and Operation of Large Steam Turbines" presented by M. Birnbaum and E. G. Noyes to the ASME–IEEE National Power Conference at Albany, New York during Sept. 19–23, 1965.

A speed detector is provided to determine the turbine shaft speed for speed control and for frequency participation control purposes. The speed detector can for example be in the form of a reluctance pickup (not shown) magnetically coupled to a notched wheel (not shown) on the turbogenerator shaft 14. Analog and/or pulse signals produced by the speed detector, the power detector, pressure detectors, the valve position detectors PDT1–PDT4, PDG1–PDG8, and PDI, the status contact(s) CSS, and other sensors (not shown) and status contacts (not shown) are employed in programmed computer operation of the turbine 10 for various purposes including controlling turbine performance on an on line real time basis, monitoring, sequencing, supervising, alarming, displaying and logging.

As illustrated in FIG. 2, the programmed digital computer control system 60 can include conventional hardware in the form of a central processor 62 and associated input/output interfacing equipment such as that sold by Westinghouse Electric Corporation under the trade name Prodac 50 (P50). In other cases such as when the turbine 10 as well as other plant eqipment units such as the steam generating system 26 are all placed under computer control, use can be made of a larger computer system such as that sold by Westinghouse Electric Corporation and known as the Prodac 250 or separate computers such as P50 computers can be employed for the respective controlled plant units. In the latter case, control process interaction is achieved by tying the separate computers together through data links and/or other means.

Generally, the P250 typically uses an integral magnetic core 16,000 word (16 bit plus parity) memory with 900 nanosecond cycle time, an external magnetic core 12,000 word or more (16 bit plus parity) memory with 1.1 microsecond cycle time and a mass 375,000 word or more (16 bit plus parity) random access disc memory unit. The P50 processor typically uses an integral magnetic core 12,000 word (14 bit) memory with 4.5 microsecond cycle time.

The interfacing equipment for the computer processor 62 includes a conventional contact closure input system 64 which scans contact or other similar signals representing the status of various plant and equipment conditions. Such contacts include the stop valve status contact(s) CSS and are otherwise generally indicated by the reference character 66. The status contacts might typically be contacts of mercury wetted relays (not shown) which are operated by energization circuits (not shown) capable of sensing the predetermined conditions associated with the various system devices. Status contact data is used in interlock logic functioning in control or other programs, protection and alarm system functioning, programmed monitoring and logging and demand logging, functioning of a computer executed manual supervisory control 68, etc.

The contact closure input system 64 also accepts digital load reference signals as indicated by the reference character 70. The load reference 70 can be manually set or it can be automatically supplied as by an economic dispatch computer (not shown). In the load control mode of operation, the load reference 70 defines the desired megawatt generating level and the computer control system 60 operates the turbine 10 to supply the power generation demand.

Input interfacing is also provided by a conventional analog input system 72 which samples analog signals from the plant 12 at a predetermined rate such as fifteen points per second for each analog channel input and converts the signal samples to digital values for computer entry. The analog signals are generated by the impulse pressure detector 40, the power detector 18, the valve position detectors PDI, PDT1–PDT4, and PDG1–PDG8, read multiplexers, and miscellaneous analog sensors 74 such as the throttle pressure detector 38 (not specifically shown in FIG. 2), various steam flow detectors, various steam temperature detectors, miscellaneous equipment operating temperature detectors, generator hydrogen coolant pressure and temperature detectors, etc. A conventional pulse input system 76 provides for computer entry of pulse type detector signals such as those generated by the speed detector. The computer counterparts of the analog and pulse input signals are used in control program execution, protection and alarm system functioning, programmed and demand logging, etc.

Information input and output devices provide for computer entry and output of coded and noncoded information. These devices include a conventional tape reader and printer system 78 which is used for various purposes including for example program entry into the central processor core memory. A conventional teletypewriter system 80 is also provided and it is used for purposes including for example logging printouts as indicated by the reference character 82.

A conventional interrupt system 84 is provided with suitable hardware and circuitry for controlling the input and output transfer of information between the computer processor 62 and the slower input/output equipment. Thus, an interrupt signal is applied to the processor 62 when an input is ready for entry or when an output transfer has been completed. In general, the central processor 62 acts on interrupts in accordance with a conventional executive program. In some cases, particular interrupts are acknowledged and operated upon without executive priority limitations.

Output interfacing is provided for the computer by means of a conventional contact closure output system 86 which operates in conjunction with a conventional analog output system 88 and with a valve position control output system 90. A manual control 92 is coupled to the valve position control output system and is operable therewith to provide manual turbine control during computer shutdown and other desired time periods.

Certain computer digital outputs are applied directly in effecting program determined and contact controlled control actions of equipment including the high pressure valve actuating fluid and lubrication system as indicated by the reference character 87, alarm devices 94 such as buzzers and displays, and predetermined plant auxiliary devices and systems 96 such as the generator hydrogen coolant system. Computer digital information outputs are similarly applied directly to the tape printer and the teletypwriter system 80 and display devices 98.

Other computer digital output signals are first converted to analog signals through functioning of the analog output system 88 and the valve position control output system 90. The analog signals are then applied to the auxiliary devices and systems 96, the fluid and lubrication systems 87 and the valve controls 50, 52, and 56 in effecting program determined control actions. The respective signals applied to the steam valve controls 50, 52, and 56 are the valve position setpoint signals SP to which reference has previously been made. Position setpoint computation for the intercept valving controls 56 would typically only be required when the intercept valves IV are to be backed off from the full open position for modulated reheat steam flow cutback.

A steam turbine control programming system is employed to operate the computer system 60. It includes control and related programs as well as certain conventional housekeeping programs directed to internal control of the functioning of the computer system itself. Since the present invention is directed in its present embodiment to the valve position control interfacing between the compute rand the steam turbine valves, detailed description of the programming system is not needed. Reference is again made to the aforementioned Birnbaum and Giras patent application for greater detail on turbine control computer programming.

Figure 3:
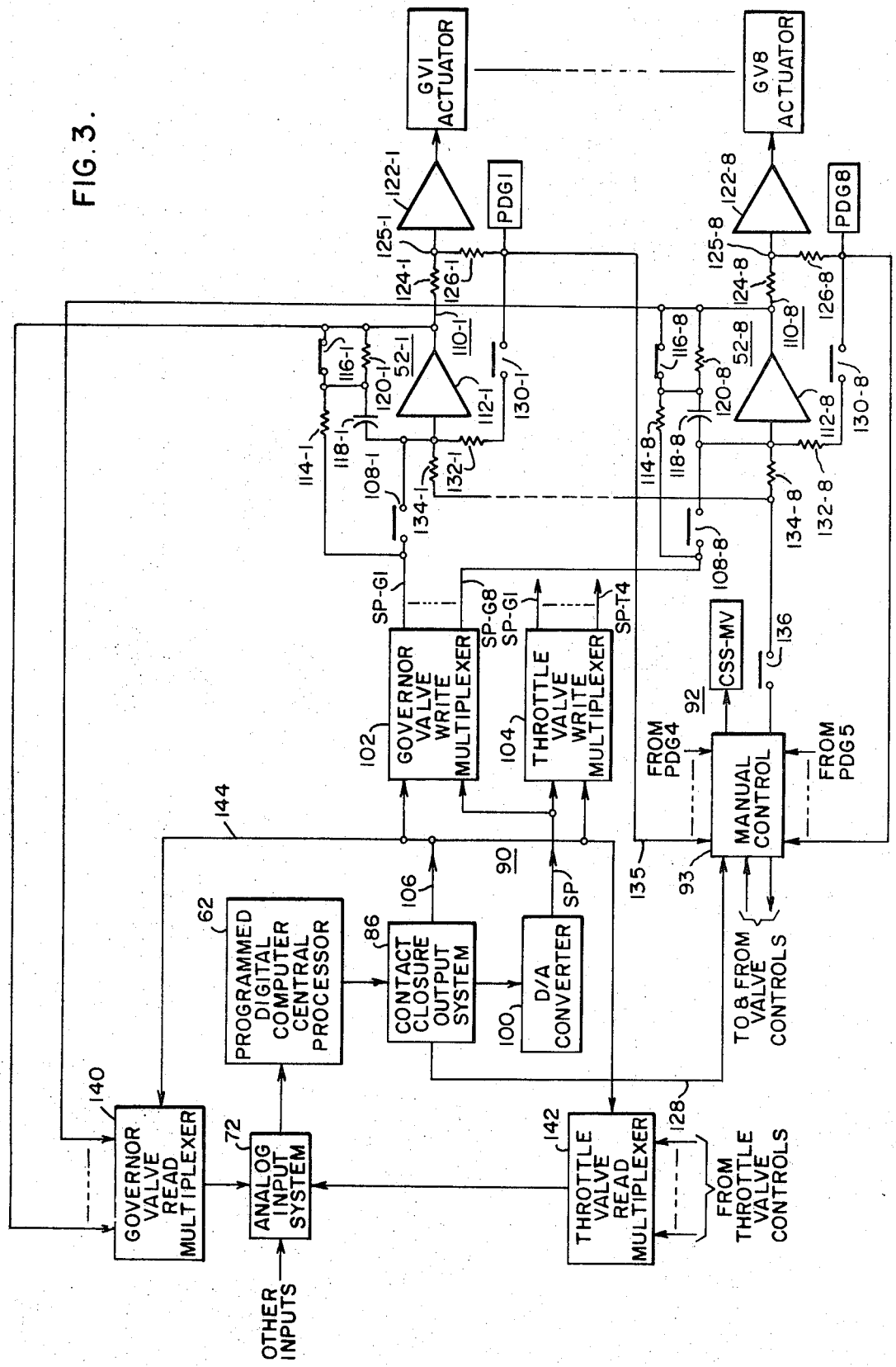
FIG. 3 shows in greater detail an output system which is included in the computer system of FIG. 2 to interface the automatic and the manual backup controls in accordance with the principles of the invention.

The arrangements and operations of the computed positioning control and its manual backup control are illustrated in greater detail in FIG. 3. Only the governor valve position control system is illustrated as a whole since the throttle valve position control system is similarly arranged. If desired, the intercept valve control system can also be similarly arranged especially for position control during reheat steam flow cutback operation.

As the computer programming system functions during automatic computer control operation, valve position control actions are determined within the computer for the turbine valves in response to turbine energization level demand placed on the turbine control system and in response to sensed turbine data including for example the sensed turbine impulse pressure. Each computed valve position control action is represented by a binary word which is registered in an assigned part of the contact closure output system 86 once an interrupt occurs to indicate the valve position control contacts in the contact closure system 86 are cleared and ready to accept a new binary valve position control word. Each new valve control word remains registered in the contact closure output system 86 until the control action directed by that control word is executed.

A valve position control action is defined in the automatic mode of operation by a fourteen bit word. The first ten bits form a binary number which represents the currently computed valve position setpoint. The next three bits form an identification number which defines the particular turbine valve to which the binary number in the first ten bit positions is to be applied. The fourteenth bit position provides a signal to start execution of the current position setpoint command when it contains a 1 bit as it would under normal operation.

All bits in the valve position control word are registered in parallel after the next previous valve position command word has been executed and the valve position control contacts in the contact closure output system 86 have been cleared. Once the control word is registered in the system 86, the execute signal in the fourteenth bit position triggers operation of the valve position control output system 90 which converts the representation of the ten bit binary command number into an analog voltage setpoint for the particular turbine valve defined by the identification number in the current valve position control word.

The throttle and governor valve controls 50 and 52 operate the turbine steam valves to satisfy updated valve position setpoints. The intercept valve control 56 similarly satisfies computed intercept valve position setpoints in applications, such as here, where intercept valve position control is provided for cutback modulation.

At a point in the control circuitry located at the input to the valve position control output system 90, the valve position control word is economically and efficiently applied to a single conventional digital to analog converter 100 which operates during successive time periods to provide conversion service for the output position control words associated with all of the turbine valves under control. The converter 100, for example, can be a typical solid state digital potentiometer which accepts a binary word in parallel across its input flip-flop circuitry. The flip-flops are operative in turn to develop an output voltage across an output ladder resistance network in correspondence to the input binary word. Accordingly, successive converter outputs are the analog valve position set-points SP to which reference has already been made in connection with the controls 50, 52 and 56 in FIG. 1. In calibrating the total system operation, the range of binary word position values, the range of analog position setpoint voltage values and the range of actual valve position values are made to correspond with each other in the case of each controlled valve.

The output position setpoint representation from the converter 100 is an analog voltage which is applied to and transferred through a governor valve signal directing circuit or a write multiplexer 102 when the current valve position control word contains a governor valve identification number. Thus, governor valve position changes are ordinarily effected by output governor valve control words during partial arc operation of the turbine 10. Throttle valve position changes are ordinarily effected through a throttle valve write multiplexer 104 by output throttle valve control words during full arc operation of the turbine 10.

The control word identification number and the control word start signal act as gating signals to the governor valve multiplexer 102 or the throttle valve multiplexer 104 as indicated by the reference character 106. Suitable transfer and logic gating circuitry is employed in the multiplexers 102 and 104 to direct or route the successive position setpoint voltages to the appropriate valve controls 50 or 52 under the gating control indicated by 106. For example, a separate switchable setpoint signal path can be formed in the governor valve write multiplexer 102 from the multiplexer input through each of eight output terminals SP–G1 through SP–G8 which are respectively coupled to the eight governor valve controls 52–1 through 52–8. To provide disclosure clarity, it is noted at this point in the description that like elements in the respective governor valve control circuit channels are herein designated by like reference characters followed by the control channel number. Gating logic circuitry is arranged to respond to the control signal 106 and make conductive that switch and that multiplexer path which corresponds to the governor valve identification number if, as would ordinarily be the case, the start signal is present in the control word. Similar considerations apply to the design of the throttle valve write multiplexer 104.

The gating logic circuitry employed in the governor valve write multiplexer 102 also operates one of eight relays (not fully shown) which respectively have tracking contacts 108–1 through 108–8 in the respective setpoint voltage paths at the inputs to the respective valve controls 52. The analog setpoint signal is thus coupled from the converter 100 through the gated multiplexer path and the operated tracking relay contact 108 to operate as an updated position setpoint signal for the governor valve control 52 identified in the current computer control word.

As each valve position control channel is operated, the updated position setpoint signal is applied through the tracking contact 108 to the input of a track and hold circuit 110. The circuit 110 preferably includes a conventional operational amplifier 112 which generates at its output an amplified representation of the updated input position setpoint signal. During closure of the input tracking contact 108, the amplifier 112 operates in its tracking mode because its output is connected to its input through an operating mode contact 116 and a feedback tracking resistor 114. A holding capacitor 118 is connected in parallel with the feedback resistor 114 during the tracking mode of operation.

The amplifier output thus tracks the setpoint input in accordance with a fixed relationship defined by the amplifier characteristics and the feedback resistance. Other possible track and hold circuits which can be used include a circuit (not shown) comprising an up/down counter coupled to an output digital to analog converter. Ordinarily, the latter track/hold circuitry would be supplied by a multiplexer as in the preferred embodiment. Manual control system interfacing at the input of the track/hold circuitry is typically more difficult if up/down counters are employed rather than operational amplifiers.

After the track and hold circuit 110 has operated in its tracking mode preferably for a time period normally sufficient for the amplifier output to reach a value representative of the updated input voltage setpoint, the governor valve write multiplexer 102 is ungated and the closed tracking relay contact 108 is opened. The circuit 110 then functions in its holding mode since the capacitor 118 operates through resistor 120 to hold the output from the amplifier 112 substantially at the updated value to which it was driven during the tracking mode. The operational amplifier hardware preferably has a low drift characteristic to make it independent of the sample interval, i.e. the time between updatings.

In the present embodiment, the tracking mode is maintained for a fixed time period of 30 milliseconds. The holding mode continues for a particular track and hold circuit 110 until the computer operates through its cycle to provide the next position setpoint updating for that circuit 110.

Timed operation of the track and hold circuits 110 is suitably provided. For example, the multiplexer 102 can include conventional clock circuitry to generate a track terminate signal thirty milliseconds after the start of each track period. The track terminate signal causes the valve position control word to be cleared from the contact closure output system 86 and the multiplexer 102 is then ungated and the corresponding closed relay contact 108 is opened. The holding period for the control channel associated with the erased output valve position control word is then begun, and a new output valve position control word is entered in the contact closure output system 86 for tracking mode operation and valve position setpoint updating in the next valve position control channel. The total cycling time period over all control channels is sufficiently fast to avoid decay of holding voltage during the holding mode of operation in any particular valve position control channel.

The amplified position setpoint signal is implemented in each valve position control channel by a conventional hydraulic actuator which in turn is operated through a conventional electrohydraulic coupling by a suitable conventional amplifier 122. A summing resistor 124 couples the amplified position setpoint signal from the operational amplifier 112 to input junction 125 of the amplifier 122. The valve position setpoint is acted upon a local closed loop analog control. Thus, an error signal is developed by summing the position setpoint and the signal from the previously identified valve position sensor PDG which is coupled to the amplifier input 125 through a negative feedback summing resistor 126. The amplifier 122 can be provided with a proportional characteristic in operating as a controller to produce the described positioning control.

Automatic cycling computer control is applied to the turbine valves in the manner described on a continuing basis. When desired by the plant operator, automatic control is interrupted by operating a manual mode relay (not shown) through a push button on a manual control unit 93 in the manual backup control system 92. Automatic control is automatically interrupted for backup manual control under predefined power system and computer malfunction conditions. Thus, when the computer detects its own malfunction or other condition which requires manual backup operation, an alarm is sounded and/or displayed and the manual mode relay (not shown) in the manual control unit 93 is operated as indicated by the reference character 128.

When the manual mode relay is operated, the mode contacts 116 are opened to enable the operational amplifiers 112 to be operated in a proportional plus integral controller mode of operation. The series feedback path through the resistor 120 and the capacitor 118 provides for proportional plus integral amplifier operation.

Manual mode relay operation also causes mode contacts 130 to close thereby applying the valve position feedback signals to the respective inputs of the amplifiers 112 through respective feedback resistors 132. A single manual position setpoint voltage is applied from a suitable setpoint voltage generator (not specifically shown in the manual control 93) to the inputs of all of the amplifiers 112 through respective input resistors 134 and through a contact 136 which is operated by the manual mode relay when the manual mode is operator selected or automatically initiated. Turbine thermal balance considerations make it desirable for safety reasons to employ a single manual position setpoint signal which provides parallel unitary operation of the governor valves. This is particularly so when the manual mode has been automatically initiated because of a power system or computer contingency or malfunction condition.

Controller operation of the operational amplifiers 112 occurs because the manual mode position setpoint signal is summed with the respective position feedback signals to produce error signals at the respective amplifier inputs and the amplifiers 112 integrate until the governor valves are positioned to drive the position error signals to zero. Contacts 108 are open during the manual mode thereby disconnecting the amplifiers 112 from the automatic control channels. Status contact CSS–MV is operated when the operator selects the manual mode thereby signalling the computer to withdraw from automatic control. The local closed analog control loops through the amplifiers 122 are retained in cascaded relation with the outer control loops in the manual mode to retain fast inner loop proportional control action. Signals from the position detectors PDG are coupled to the manual control unit 93 as indicated by the reference character 136 for valve position display during manual as well as automatic operation.

In the manual control 93, the manual mode position setpoint reference generator is operated by up/down push buttons (not shown). The generator itself can for example include an up/down digital counter (not shown) which operates a solid state digital potentiometer (not shown) in developing the manual analog position setpoint voltage. The counter counts to change the setpoint voltage when one of the buttons is depressed.

If desired, the computer can be programmed to generate an output over coupling 128 which causes the digital counterpotentiometer or other generator means to operate during the automatic mode under computer control and generate and analog position setpoint voltage corresponding to the speed and/or load level of the turbine. Switchover to manual mode then is made substantially without any tendency for the manual control system 92 to make undersired changes in the total turbine energization level otherwise resulting if the manual position setpoint happens to be materially different from the net effective automatic position setpoint corresponding to the holding amplifier outputs existing at the switchover time point.

During the automatic mode of governor valve control, the governor valves are sequentially operated to meet swings in load on the turbine. Therefore, the various governor valves may be closed, partly open or fully open when manual operation is initiated. The manual governor valve setpoint reference will accordingly cause some governor valve movement to cause full arc valve alignment even if the manual setpoint is computer matched to the net effective automatic governor valve setpoint.

Manual control of the throttle valves and manual control of the intercept valves are achieved in a manner similar to that described for the governor valves. In the governor valve control mode, the throttle valves are held fully open by the throttle position setpoint voltage. In the throttle valve control mode, the governor valves are held fully open by the governor position setpoint voltage.

In order to provide the foundation for bumpless transfer from manual to automatic operation, a governor valve read multiplexer 140 keeps the computer updated on governor valve positions during the manual mode of operation. As indicated by the reference character 144, the computer signals the governor valve read multiplexer 140 when the system is operating in the manual mode. The multiplexer 140 is then gated to accept the respective output voltages from the integrating amplifiers 112 in time succession. The multiplexer 140 can be an assigned part of the conventional multiplexer in the analog input system 72 or it can, as here, be a separate conventional self-cycling multiplexer.

Within the computer, the integrating amplifier output voltages are converted to representations of the setpoint voltages required at the integrating amplifier inputs to produce the read output voltages during the automatic mode. Thus, when appropriately programmed, the computer can initiate automatic control bumplessly from the manual control level existing at any time point that the operator selectively initiates automatic operation (i.e. opens the contact CSS–MV).

Similar comments apply to operation of a throttle valve read multiplexer 142 used in transfer from manual to automatic throttle valve control. Intercept valve control similarly can employ read multiplexing. Further details on the computer software aspects of individual valve position setpoint determination are presented in the aforementioned Birnbaum and Giras copending application.

In brief summary, a digital computer control system is interfaced with a manual control to provide improved steam turbine operation. The digital computer outputs are applied in time series to a digital to analog converter for economic conversion to analog values. The converted outputs are multiplexed and applied to respective track and hold circuits where they are processed to operate as updated setpoints in local position control loops for the turbine valves. Reliability and security are gained from the fact that the occurrence of a computer or other malfunction will cause transfer to manual operation and can thus cause a position setpoint error only in the turbine valve under setpoint updating at the time of the malfunction. A manual control is coupled to the track and hold circuits to provide a single position setpoint signal for safe parallel valve operation in the manual mode. The preferred track and hold operational amplifiers enable transfer to be made conveniently from automatic to manual operation. Manually controlled changes in the positions of the turbine valves are multiplexed into the computer to keep the computer updated and thereby enable bumpless transfer from the manual to the automatic mode.

If a backup turbine control computer is provided it would ordinarily still be desirable to employ a manual backup control system in accordance with the principles of the invention. If the primary turbine control computer provides direct digital control of the turbine valves with or without a backup direct digital control computer, a manual backup control system would ordinarily still be desirably employed in accordance with the principles of the invention. In direct digital computer applications, the track and hold circuitry in each control channel is electrohydraulically coupled to the associated turbine valve without local analog control looping. On transfer to manual operation, the direct digital system is accordingly subjected to open loop manual control or, if desired, closed loop manual control can be instituted by appropriate circuit switching which establishes position feedback for closed loop control.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A control system for apparatus having a plurality of devices with each device being characterized with at least one controllable variable which affects the operation of the apparatus, said control system comprising a digital computer system cyclically operative to generate at one of its outputs sequential control words which define respective setpoints for the variables associated with the respective devices, means for generating feedback signals respectively representative of the values of the device variables, means for directing representations of the sequential setpoint control words into respective parallel control channels associated with the respective devices, means for electrically tracking each setpoint representation and for electrically holding the tracked setpoint representation in the time interval between successive computer control word outputs in the same control channel, means for controlling the respective devices to make the controlled variables associated therewith follow the tracked setpoint representations, means for converting each setpoint representation from digital to analog form at a control circuit point located between said device controlling means and said one computer system output, and a manual backup control system including means for applying a manual setpoint representation to a predetermined point in each of the control channels when said computer system is disconnected under predetermined conditions.

2. A control system as set forth in claim 1 wherein said converting means includes a digital to analog converter coupled between the one computer output and said directing means, and wherein said directing means is a multiplexer operative to direct the successive analog setpoint representations from said converter to the inputs of said tracking and holding means in the corresponding control channels assigned to said converter.

3. A control system for a steam turbine having a plurality of valves which are controllable in position to determine the operating level of the turbine, said control system comprising a digital computer system cyclically operative to generate at one of its outputs sequential control words which define respective position setpoints for the respective valves, means for generating feedback signals respectively representative of the valve positions, means for directing representations of the sequential position setpoint control words into respective parallel control channels associated with the respective valves, means for electrically tracking each position setpoint representation and for electrically holding the tracked position setpoint representation in the time interval between successive computer outputs in the same control channel, means for controlling the positions of the valves to follow respectively the position setpoint representations, means for converting each position setpoint representation from digital to analog form at a control circuit point located between said valve position controlling means and said one computer system output, and a manual backup control system including means for applying a manual position setpoint representation to a predetermined point in each of the control channels when said computer system is disconnected under predetermined conditions.

4. A digital computer steam turbine control system as set forth in claim 3 wherein the turbine valves include a plurality of sequentially operable governor valves and wherein said manual setpoint applying means applies a single position setpoint signal to all of the governor valve control channels.

5. A digital computer steam turbine control system as set forth in claim 3 wherein said tracking and holding means comprises respective operational amplifiers connected in the control channels, means are provided for operating said amplifiers as tracking devices during setpoint updating from the computer, means are provided for operating said amplifiers as holding devices during time intervals between setpoint updatings, and means are provided for operating said amplifiers as integrating controllers in response to the position feedback signal and manual position setpoint representations during manual backup system operation.

6. A digital computer steam turbine control system as set forth in claim 3 wherein the turbine valves include a plurality of sequentially operable governor valves, wherein said tracking and holding means comprises respective operational amplifiers connected in the control channels, means are provided for operating said amplifiers as tracking devices during setpoint updating from the computer, means are provided for operating said amplifiers as holding devices during time intervals between setpoint updatings, means are provided for operating said amplifiers as integrating controllers in response to the position feedback and manual setpoint representations during manual backup system operation, and wherein said manual setpoint applying means applies a single position setpoint signal to the operational amplifier inputs in all of the governor valve control channels.

7. A digital computer steam turbine control system as set forth in claim 3 wherein means are provided for coupling to the computer respective manual position setpoint representations in the respective control channels during manual backup system operation.

8. A digital computer steam turbine control system as set forth in claim 7 wherein means are provided for operating at least one of said valve position controlling means and said tracking and holding means in each control channel as a controller with an integral characteristic and wherein said coupling means comprises a read multiplexer coupled from an output from the integrating controller in each control channel to a computer system input.

9. A digital computer steam turbine control system as set forth in claim 3, wherein means are provided for operating said tracking and holding means and said valve position controlling means as cascaded controllers in the respective control channels in said manual backup control system.

10. A digital computer steam turbine control system as set forth in claim 5 wherein a read multiplexer is coupled between the operational amplifier outputs and a computer system input to keep the computer updated on manual valve positioning.

11. A digital computer steam turbine control system as set forth in claim 3 wherein said converting means includes a digital to analog converter coupled between the one computer output and said directing means, and wherein said directing means includes a write multiplexer operative to direct the successive analog position setpoint representations from said converter to the inputs of said tracking and holding means in the corresponding control channels assigned to said converter.

12. A digital computer steam turbine control system as set forth in claim 11 wherein each computer control word contains a number identifying the valve to which the control word applies, and said write multiplexer is responsive to the control words to direct the analog position setpoint representations into the appropriate control channels.

13. A digital computer steam turbine control system as set forth in claim 11 wherein the turbine valves include a plurality of sequentially operable governor valves and wherein said manual setpoint applying means applies a single position setpoint signal to all of the governor valve control channels.

14. A digital computer steam turbine control system as set forth in claim 11 wherein said tracking and holding means comprises respective operational amplifiers in the control channels, the inputs of said amplifiers are coupled to outputs from said write multiplexer, means are provided for operating said amplifiers as tracking devices during setpoint updating from the computer, means are provided for operating said amplifiers as holding devices during time intervals between setpoint updatings, and means are provided for operating said amplifiers as integrating controllers in response to the position feedback and manual setpoint representations during manual backup system operation.

15. A digital computer steam turbine control system as set forth in claim 11 wherein means are provided for coupling to the computer respective manual position setpoint representations in the respective control channels during manual backup system operation.

16. A digital computer steam turbine control system as set forth in claim 14 wherein a read multiplexer is coupled between the operational amplifier outputs and a computer system input to keep the computer updated on manual valve positioning.

17. A digital computer steam turbine control system as set forth in claim 14 wherein means are provided for operating said operational amplifiers and said position controlling means as cascaded controllers in the respective control channels during manual backup system operation.

References Cited
UNITED STATES PATENTS

| | | | |
|---|---|---|---|
| 3,097,488 | 7/1963 | Eggenberger et al. | 415—17 |
| 3,288,160 | 11/1966 | Eggenberger et al. | 415—17 |
| 3,233,412 | 2/1966 | Wagner | 415—17 |

HENRY R. RADUAZO, Primary Examiner